United States Patent Office 3,334,341
Patented Aug. 1, 1967

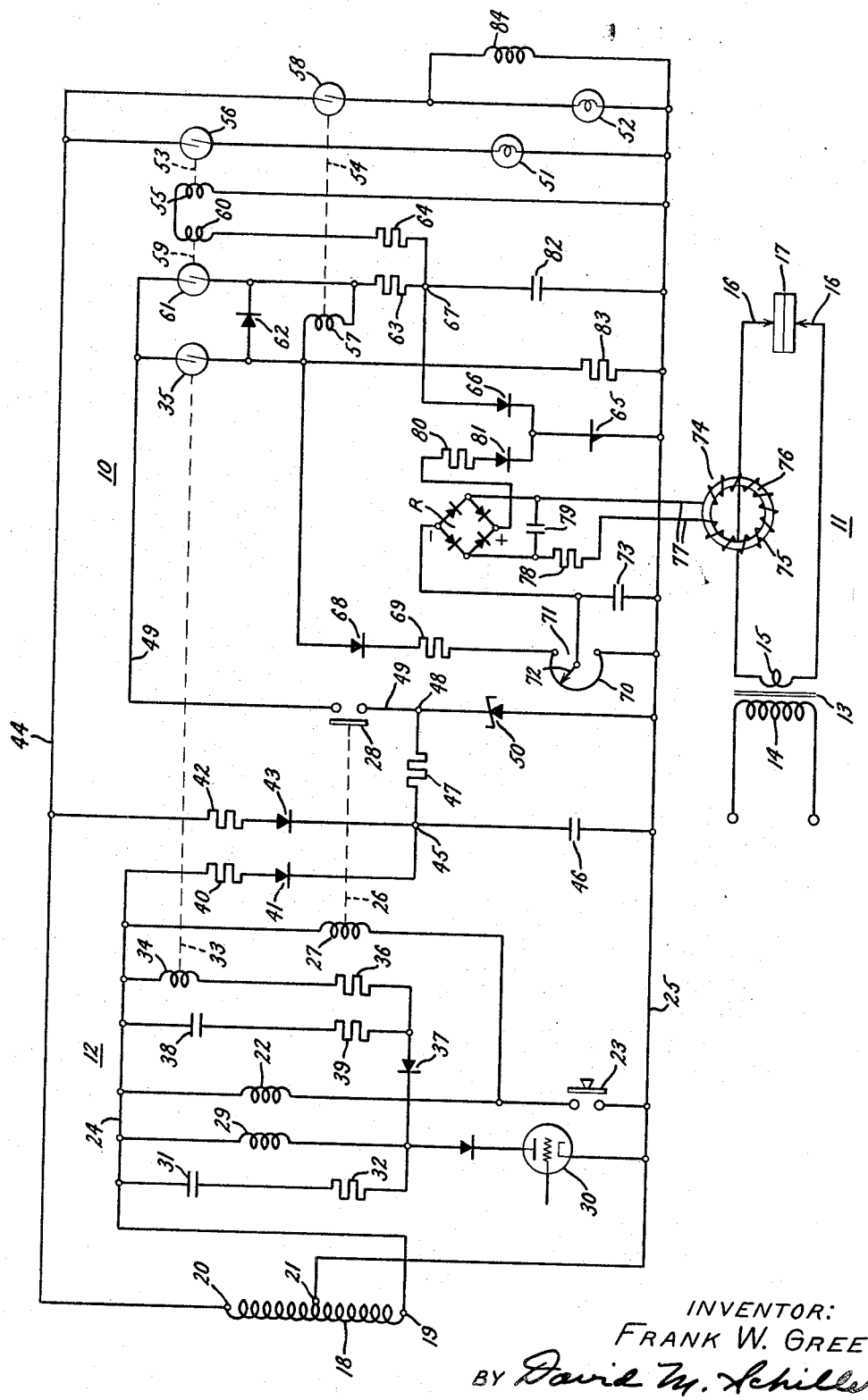

3,334,341
CIRCUIT FOR MONITORING A VARIABLE
ELECTRICAL QUANTITY
Frank W. Green, Cleveland, Ohio, assignor to General
Electric Company, a corporation of New York
Filed Feb. 17, 1964, Ser. No. 345,478
7 Claims. (Cl. 340—248)

This invention relates to a device for monitoring a variable quantity and has particular relation to a device for monitoring welding current during a resistance welding operation.

Numerous applications exist wherein it is desirable to monitor a variable quantity. In the field of resistance welding, for example, if the magnitude of welding current is less than a predetermined desired value, welds of inferior quality can result. Inasmuch as heat generated at the weld area during a resistance weld is a function of the square of the magnitude of welding current, a small deviation in the magnitude of the welding current below the predetermined value causes a comparatively large deviation in the amount of heat generated at the weld below that necessary for a satisfactory weld. It is therefore very desirable that provision be made for monitoring the welding current and for alerting the operator when welding current does not attain the predetermined magnitude necessary to provide a satisfactory weld.

Accordingly, it is a primary object of the invention to provide novel and improved means for accurately monitoring a variable quantity.

It is another object of the invention to provide novel and improved means of inexpensive and compact construction for accurately monitoring welding current during a welding operation.

It is a further object of the invention to provide a novel and improved monitoring device of inexpensive and compact construction which can be incorporated into existing welding equipment and which accurately indicates whether or not the welding current has attained a predetermined desire magnitude.

In carrying out the invention in one form, the monitoring device includes two indicating lamps each controlled by a separate relay, the relays being normally de-energized to cause the lamps to be normally extinguished. A control switch is arranged to be closed prior to initiation of the operation during which monitoring is effected, and to be opened subsequent to termination of such operation. Closure of the control switch effects energization of a first one of the relays to light the associated first lamp. The device includes sensing means arranged to respond to the quantity to be monitored and to produce an output voltage which is proportional to the magnitude of such quantity. Control means is connected to respond to the output voltage to deenergize the first relay and extinguish the first lamp, and also to maintain the second relay deenergized and the second lamp extinguished even when the control switch is subsequently opened if the magnitude of the quantity being monitored exceeds a predetermined magnitude. The control means is further arranged to maintain the first relay energized and its associated lamp lit if the magnitude of the monitored quantity is less than the predetermined magnitude. However, when this latter condition prevails, opening of the control switch at the end of the operation results in energization of the second relay so that its associated lamp also becomes lit.

Other objects and advantages of the invention will become apparent from the following description taken in conjunction with the accompanying drawing in which the single figure is a schematic circuit representation illustrating the monitoring device of the present invention.

Referring now to the drawing, the single figure illustrates the monitoring device of the present invention employed by way of example in association with resistance welding apparatus to monitor the welding current. The monitoring device is represented generally by the numeral 10 and is designed to monitor welding current in a welding circuit represented generally by the numeral 11. A control unit represented generally by the numeral 12 is included in the welding apparatus for controlling the welding operation and also the monitoring operation. The circuit 11 includes a welding transformer 13 having a primary winding 14 adapted for energization from a suitable voltage source, and a secondary winding 15 for supplying welding current to electrodes 16 between which is positioned the workpieces 17 to be welded.

Operating voltage for the monitoring device 10 and the control unit 12 is derived from a suitable alternating current voltage source shown as the secondary winding 18 of a transformer having terminals 19 and 20 and a center tap connection 21. Voltage at the terminals 19 and 20 may be of the order of 230 volts. In conventional resistance welding apparatus, the unit 12 includes a weld-no weld relay having a coil 22 connected to be energized under control of a manually operable switch 23 from conductors 24 and 25 leading respectively to the terminal 19 and center tap 21 of the winding 18. A relay 26 is provided to control application of voltage to the monitoring device 10 and is connected to operate with the weld-no weld relay. For this purpose, relay 26 includes a coil 27 connected in parallel with the coil 22, and also includes a movable normally open contact 28 for interrupting and establishing the energizing circuit for the device 10 which circuit will be described more fully hereinafter.

The unit 12 also conventionally includes a solenoid valve relay having a coil 29 connected to be energized from the conductors 24 and 25. The coil 29 is automatically energized and deenergized for each weld operation under control of a thyratron tube 30 to actuate contacts (not shown) connected to control a solenoid valve which effects movement of the welding electrodes 16. The coil 29 is shunted by the series connection of a capacitor 31 and a resistor 32. In conventional welders, the arrangement is such that the solenoid valve relay is energized upon initiation of a weld, remains energized through the "squeeze," "weld" and "hold" intervals, and is deenergized after the latter interval.

The device 10 is prepared for its monitoring function by operation of a relay 33 which is operated with the solenoid valve relay. To this end the relay 33 includes a coil 34 in series with a resistor 36 and a diode 37, the elements 34, 36, and 37 being connected in parallel with the coil 29 of the solenoid valve relay. The coil 34 and resistor 36 are shunted by the series connection of a capacitor 38 and resistor 39. Relay 33 includes normally open contacts 35 in an energizing circuit for a control relay of the device 10 as will appear hereinafter. Relay 33 may comprise any suitable type of relay, and is preferably in the form of a magnetic reed switch relay wherein the contacts 35 are in the form of overlapping magnetic reeds located in a sealed tube surrounded by the coil 34. A relay of this type suitable for the present invention is disclosed in Patent 2,289,830.

Portions of the device 10 are energized in accordance with a direct current voltage and for this purpose a full wave center tapped rectifier is provided to produce a direct current voltage from the alternating voltage appearing across the secondary winding 18. As shown, the rectifier includes a first branch containing in series a resistor 40 and a diode 41 connected to conductor 24, and a second branch consisting of a resistor 42 and a diode 43 connected in series to a conductor 44 leading to terminal 20 of secondary 18. These two branches are connected together at the terminal 45 and a capacitor 46 is connected between terminal 45 and conductor 25 in series with each of the above-described branches. A resistor 47 is connected between the terminal 45 and a terminal 48 connected to a conductor 49 which includes spaced fixed contacts cooperating with the contact 28 of the relay 26. A Zener diode 50 is connected between the terminal 48 and the conductor 25 to insure a constant direct current voltage source for portions of the device 10. Voltage between conductor 25 and terminal 48 is preferably about 27 volts.

The device 10 includes a pair of translating devices 51 and 52 which provide an indication of the condition of the device 10 and of the welding current being monitored. The translating devices preferably comprise indicating lamps, but other types of translating devices can also be employed, such as relays for performing various functions. The lamps 51 and 52 are connected across the conductors 25 and 44 to be energized under the control of relays 53 and 54, respectively. The relay 53 includes a coil 55 and normally open contacts 56 in the energizing circuit for the lamp 51, and the relay 54 similarly includes a coil 57 and normally open contacts 58 in the energizing circuit for lamp 52. The relays 53 and 54 preferably comprise magnetic reed switch relays similar to the relay 33. An additional holding relay 59 is provided to be operated with the relay 53. Relay 59 includes a coil 60 in series with coil 55 of relay 53, and includes also normally open contacts 61 connected between the conductor 49 and one terminal of the coil 57 of relay 54. The relay 59 is preferably a magnetic reed switch relay. The contacts 35 of relay 33 are connected between conductor 49 and the other terminal of the coil 57.

The energizing circuit for the coils 55 and 60 of the relays 53 and 59 extends between the conductors 49 and 25 and includes, in addition to such coils, contacts 35 of relay 33, a diode 62 connected in shunt with the coil 57 of relay 54, and a pair of resistors 63 and 64 all in series. When this energizing circuit is established by closure of contacts 28 and 35, the contacts 56 and 61 of relays 53 and 59 are closed and the lamp 51 becomes lit to indicate that the device 10 is prepared for its monitoring function.

The monitoring device includes control means for effecting various controlling functions dependent upon the magnitude of the welding current being monitored. The control means includes a breakdown device 65 which is preferably in the form of a PNPN diode, also known as a Shockley diode. The diode 65 is of such a nature that it prevents the flow of appreciable current in the forward direction, which is in a downward direction in the drawing, until the anode-cathode voltage exceeds the breakdown voltage of the device. When this occurs, the device enters a high conduction state to freely pass current in a forward direction at which time the forward voltage across the device drops to a very low value. The device remains in a high conduction state so long as current passing through it remains above a certain holding level. It can be appreciated that a breakdown device other than a PNPN diode can be employed such, for example, as a silicon controlled rectifier connected to breakdown in the forward direction in response to anode-cathode voltage instead of in response to a gating signal. The device 65 is connected in series with a diode 66 in a shunt circuit which is connected between a terminal 67 intermediate the resistors 63 and 64 and the conductor 25. This shunt circuit shunts the coils 55 and 60 of the relays 53 and 59.

The voltage applied to the breakdown device 65 consists of a preset reference voltage derived from the direct current voltage appearing across the diode 50, and also a variable output voltage produced by a sensing device responsive to the welding current. The sensing device will be described hereinafter. In order to provide the reference voltage a diode 68, resistor 69 and resistance portion 70 of a potentiometer 71 are connected in series with the contacts 35 of relay 33 between the conductors 49 and 25. Potentiometer 71 includes a movable conductive arm 72 in movable contact with resistance portion 70, the arm 72 being connected to the upper terminal of a capacitor 73 having a lower terminal connected to the conductor 25. With this arrangement, an adjustable direct current voltage appears across the capacitor 73 which is applied to the device 65 as will presently appear.

As previously stated, a variable voltage is also applied to the device 65, and this has a magnitude proportional to the magnitude of the welding current being monitored. The variable voltage is produced by a sensing device 74 arranged to respond to the welding current. The sensing device 74 may comprise any suitable device which produces an output voltage having a magnitude proportional to the magnitude of a variable input quantity applied thereto. The device 74 preferably includes an air core transformer of the design described in paper 44-4 presented at the AIEE national technical meeting Jan. 24, 1944, by Walter Richter and entitled, "An Instrument for the Measurement of Large Alternating Currents." The transformer consists of a toroidal coil 75 wound on a flexible core 76, such as a heavy walled rubber tubing. The winding is distributed uniformly over the length of the tubing and links the welding current in the circuit 11. The terminal leads 77 of the coil 75 have connected thereacross a resistor 78 and a capacitor 79 in series comprising an integrating circuit. It can be demonstrated that the magnitude of voltage appearing across capacitor 79 is proportional to the magnitude of current linked by the coil 75. In the illustrated embodiment this voltage is applied to the input terminals of a full wave rectifier R having output terminals connected with the polarity shown in series with capacitor 73, a resistor 80, a diode 81 and device 65 so that the output voltage of rectifier R is applied to device 65 in cumulative relation the reference voltage across capacitor 73. Rectifier R causes the unit to respond to both positive and negative welding current pulses and may be omitted in applications wherein the welding is accomplished in a half cycle or less. A capacitor 82 is connected between the terminal 67 and the conductor 25. A resistor 83 is connected in series with the contacts 35 of relay 33, the series connected contacts 35 and resistor 83 being connected across conductors 49 and 25.

Operation of the device will now be described. Initially, all relays are deenergized and their contacts are open. The arm 72 is set to give a magnitude of voltage across capacitor 73 which is less than the breakdown voltage of device 65 by an amount such that when voltage across rectifier R is added thereto, the sum voltage will cause breakdown of device 65 when the welding current exceeds a predetermined value. When it is desired to perform a weld, an operator closes the switch 23 which effects energization of the coil 22 of the weld-no weld relay. Closure of switch 23 also results in energization of coil 27 of relay 26 to actuate contact 28 for closing the fixed contacts in conductor 49. The coil 29 of the solenoid valve relay is automatically energized in response to closure of a cycle initiation switch (not shown) which fires the thyratron 30 and this results in energization of coil 34 of relay 33 to thereby close the contacts 35. Closure of contacts 35 results in the application to potentiometer 71 of part of the voltage across diode 50. A predetermined portion of the voltage applied to potentiometer 71 is applied across capacitor 73 as determined by the setting of arm 72. Further, closure of contacts 35 effects energization of coils 55 and 60 of relays 53 and 59 to close contacts 56 and light lamp 51, and to close contacts 61. Current cannot flow through coil 57 of relay 54 at this time because of diode 62.

When welding current flows in the circuit 11, a voltage is induced in coil 75 having a magnitude proportional to the rate of change of the welding current and this voltage is integrated by the network 78, 79. The voltage appearing across capacitor 79 has a magnitude proportional to the magnitude of the welding current. The arrangement is such that if the magnitude of welding current exceeds the predetermined magnitude, the sum of the voltages across capacitor 73 and rectifier R causes the device 65 to break down. When this occurs, current flowing through the coils 55 and 60 of relays 53 and 59 is diverted therefrom to flow through the shunt circuit including the device 65. This results in deenergization of coils 55 and 60 and opening of the contacts 56 and 61. Opening of contacts 56 results in extinguishment of the lamp 51 which indicates that the magnitude of welding current has exceeded the predetermined magnitude and that a satisfactory weld has most likely been performed. Device 65 is maintained in a conducting state by a holding current supplied thereto through contacts 35, diode 62, resistor 63 and diode 66. Subsequent deenergization of coil 29 of the solenoid valve relay results in deenergization of coil 34 of relay 33 and opening of contacts 35 to reset the device.

The arrangement is such that if the magnitude of welding current is less than the desired predetermined magnitude, the sum of the voltages across capacitor 73 and rectifier R is insufficient to break down the device 65. For this condition, the device 65 remains nonconducting so that the shunt circuit including device 65 is open. The coils 55 and 60 of relays 53 and 59 thus remain energized through contacts 35 and also contacts 61 so that contacts 56 remain closed to continue the illumination of the lamp 51. When the solenoid valve relay is subsequently deenergized, contacts 35 of relay 33 will open. However, at this time contacts 61 of relay 59 are closed and therefore current will flow through contacts 61, coil 57 of relay 54 and parallel paths including resistor 83 and potentiometer 71. When coil 57 is so energized, contacts 58 close which results in illumination of the lamp 52 so that both of the lamps are now illuminated which indicates to an operator that the welding current did not attain the predetermined magnitude during the welding operation. If desired, a coil 84 of a relay may be connected across the lamp 52 so that when this lamp is lit, the relay coil 84 is also energized to effect a controlling function, such as preventing further operation of the welding apparatus. The device may be reset by merely opening switch 23 which results in deenergization of coil 27 of relay 26 and opening of the fixed contacts in conductor 49.

Although the monitoring device 10 has been described in association with welding apparatus to monitor welding current, it has numerous other applications and is capable of accurately monitoring any quantity which can be converted to a voltage. In welding applications, the device 10 is also capable of monitoring weld energy and a number of cycles of welding current.

While I have shown and described a particular embodiment of my invention, it will be obvious to those skilled in the art that various changes and modifications may be made without departing from my invention in its broader aspects and I, therefore, intend in the appended claims to cover all such changes and modifications as fall within the true spirit and scope of my invention.

What I claim as new and desire to secure by Letters Patent of the United States is:

1. A device for monitoring a variable electrical quantity comprising, an indicating lamp, a relay having a coil for controlling energization of said lamp, means for controlling energization of said relay coil including a switch effective when closed for energizing said relay coil to light said lamp, a breakdown device having two main terminals which is rendered conducting between said main terminals when voltage applied to said main terminals exceeds its breakdown voltage and which is nonconducting when voltage applied to said main terminals is less than its breakdown voltage, and circuit means connected to divert current away from said relay coil through said breakdown device in response to breakdown thereof for deenergizing said relay coil and extinguishing said lamp; means connected to apply to said main terminals a predetermined voltage having a magnitude less than said breakdown voltage, and means responsive to the quantity to be monitored for applying to said main terminals in cumulative relation to said predetermined voltage a second voltage which is a function of the variable quantity.

2. A device for monitoring a variable electrical quantity comprising, first and second translating devices energizable by electrical currents each having first and second states dependent upon its condition of energization, said devices normally being in their first states, a control switch, circuit means responsive to closure of said control switch to transfer said first device from its first state to its second state and to maintain said second device in its first state, sensing means responsive to the quantity to be monitored for producing an output voltage which is a function of the quantity, control means responsive to said output voltage and operable to transfer said first device from said second state to said first state and to maintain said second device in its first state if said output voltage exceeds a certain value, and means responsive to opening of said switch for transferring said second device from said first state to said second state and to maintain said first device in its second state if said output voltage is less than said certain value.

3. A device for monitoring a variable electrical quantity comprising, first and second electrically energizable translating devices each having first and second states dependent upon its condition of energization, said translating devices normally being in their first states, a control switch, first circuit means responsive to closure of said control switch to transfer said first translating device from its first state to its second state and to maintain said second translating device in its first state, a breakdown device which is rendered conducting when voltage applied thereto exceeds its breakdown voltage and which is nonconducting when voltage applied thereto is less than the breakdown voltage, second circuit means responsive to closure of said control switch to apply to said breakdown device a predetermined direct current voltage having a magnitude less than said breakdown voltage, sensing means responsive to the quantity to be monitored for applying to said breakdown device in cumulative relation to said predetermined voltage a second direct current voltage which is a function of said quantity, third circuit means effective in response to breakdown of said breakdown device for transferring said first translating device from said second state to said first state and for maintaining said second translating device in said first state, and means effective in response to opening of said control switch for transferring said second translating device from said first state to said second state and for maintaining said first translating device in said second state if the sum voltage of said predetermined voltage and said second voltage is insufficient to breakdown said breakdown device.

4. A device for monitoring a variable electrical quantity comprising, first and second translating devices energizable by electrical currents each having first and second states dependent upon its condition of energization, first and second relays for respectively controlling energization of said first and second translating devices, said relays normally being deenergized for establishing said first states and being effective when energized to establish said second states, a control switch, first circuit means connected to said control switch and to said first and second relays effective in response to closure of said control switch to energize said first relay to thereby transfer said first translating device from said first state to said second state, and to prevent energization of said second relay to maintain said second translating device in its first state, a breakdown device which is rendered conducting when voltage applied thereto exceeds its breakdown voltage and which is nonconducting when voltage applied thereto is less than said breakdown voltage, second circuit means responsive to closure of said control switch to apply to said breakdown device a predetermined voltage having a magnitude less than said breakdown voltage, sensing means responsive to the quantity to be monitored for applying to said breakdown device in cumulative relation to said predetermined voltage a second voltage which is a function of said quantity, third circuit means effective in response to breakdown of said breakdown device for deenergizing said first relay to transfer said first translating device from its second state to its first state, and for maintaining deenergization of said second relay to maintain said second translating device in its first state, and means effective in response to opening of said control switch for energizing said second relay to transfer said second translating device from said first state to said second state, and for maintaining energization of said first relay to maintain the first translating device in its second state if said second voltage is insufficient to breakdown said breakdown device.

5. A device for monitoring welding current comprising, an indicating lamp, a relay for controlling energization of said lamp, a switch effective when closed for energizing said relay to light said lamp, a breakdown device which is rendered conducting when voltage applied thereto exceeds a predetermined breakdown voltage and which is nonconducting when voltage applied thereto is less than said breakdown voltage, means for applying a predetermined voltage to said breakdown device which is less than said breakdown voltage, sensing means including a toroid coil linking the current to be monitored, and an integrating circuit connected to the output terminals of the toroid coil for applying to said breakdown device in cumulative relation to said predetermined voltage a second voltage which is substantially proportional to the magnitude of current to be monitored; and circuit means effective in response to breakdown of said breakdown device for deenergizing said relay means to extinguish said lamp.

6. A device for monitoring welding current comprising, first and second indicating lamps, first and second relays having normally open contacts respectively in the energizing circuits for said lamps and having coils effective when energized to close said contacts, a control switch adapted to be closed prior to a welding operation and opened subsequent to a welding operation, circuit means effective in response to closure of said control switch to energize the coil of said first relay for lighting said first lamp and for preventing energization of the coil of said second relay for maintaining said second lamp extinguished, a breakdown device which is rendered conducting when voltage applied thereto exceeds said breakdown voltage and which is nonconducting when voltage applied thereto is less than said breakdown voltage, means responsive to closure of said control switch to apply to said breakdown device a predetermined direct current voltage less than said breakdown voltage, sensing means including a toroid coil linking the welding current to be monitored, an integrating circuit connected to the output terminals of said toroid coil, and a full wave rectifier connected to the output of said integrating circuit to apply to apply to said breakdown device in cumulative relation to said predetermined voltage a second direct current voltage which is substantially proportional to the magnitude of said welding current; a shunt circuit including said breakdown device connected in shunt circuit relation with the coil of said first relay to divert current therefrom when the breakdown device is rendered conducting to extinguish said first lamp, means effective to maintain deenergization of the coil of said second relay to maintain said second lamp extinguished if said breakdown device breaks down, and circuit means effective in response to opening of said control switch to energize the coil of said second relay to light said second lamp and to maintain energization of the coil of said first relay to maintain the first lamp lit if said second voltage is insufficient to breakdown said breakdown device.

7. A device for monitoring welding current comprising, first and second indicating lamps, energization circuits for said lamps, first and second relays having normally open contacts respectively in the energization circuits for said first and second lamps and having coils effective when energized to close said contacts, a first energization circuit for the coil of said first relay, a control switch in said first energization circuit adapted to be closed prior to a welding operation and opened subsequent to a welding operation, a diode connected in shunt with the coil of said second relay and in series with said control switch, a second energization circuit for the coil of said second relay, said first relay having contacts in said second energization circuit, the series connection of said diode and said control switch being connected in shunt with said holding contacts, said control switch when closed effecting energization of the coil of the first relay through said diode to light said first lamp, said diode preventing energization of the coil of said second relay to maintain said second lamp extinguished when said switch is closed, a breakdown device which is rendered conducting when voltage applied thereto exceeds its breakdown voltage and which is nonconducting when voltage applied thereto is less than said breakdown voltage, means responsive to closure of said control switch to apply to said breakdown device a predetermined direct current voltage less than said breakdown voltage, sensing means including an air core toroid coil linking the welding current to be monitored, an integrating circuit connected to the output terminals of said toroid coil, and a full wave rectifier connected to the output of said integrating circuit to apply to said breakdown device in cumulative relation to said predetermined voltage a second direct current voltage which is substantially proportional to the magnitude of said welding current, and a shunt circuit including said breakdown device connected in shunt circuit relation with the coil of said first relay to divert current therefrom when the breakdown device is rendered conducting to extinguish said first lamp, said diode maintaining deenergization of the coil of said second relay to maintain said second lamp extinguished when the breakdown device is rendered conducting, the coils of both relays being energized through said holding contacts in response to opening of said control switch if said second voltage is insufficient to breakdown said breakdown device whereby both lamps are lit.

References Cited

UNITED STATES PATENTS

| | | |
|---|---|---|
| 1,547,693 | 7/1925 | Schon et al. |
| 2,343,001 | 2/1944 | Cohen _____ 317—149 X |
| 2,536,527 | 1/1951 | Appel _____ 317—149 X |
| 2,748,380 | 5/1956 | Platte et al. _____ 340—248 X |
| 3,050,644 | 8/1962 | Ironside. |
| 3,058,034 | 10/1962 | Sandin _____ 317—31 X |
| 3,207,922 | 9/1965 | Gruodis et al. _____ 307—88.5 |
| 3,230,459 | 1/1966 | Loya _____ 317—33 X |

FOREIGN PATENTS 201,175    2/1956    Australia.

NEIL C. READ, *Primary Examiner.*

D. MYER, *Assistant Examiner.*